March 3, 1970  J. T. VENALECK  3,497,879
SELF-RISE BED

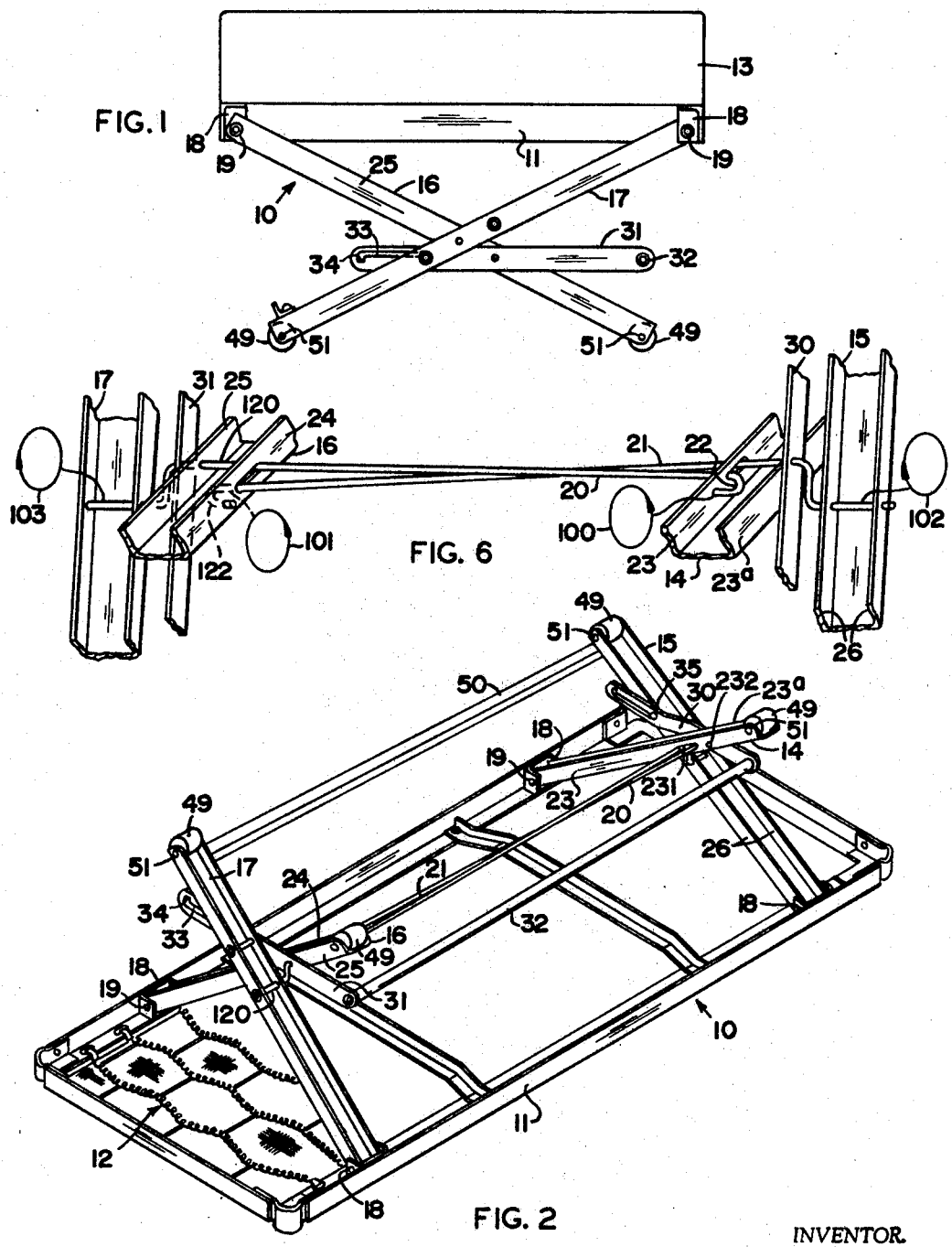

Filed July 8, 1968  2 Sheets-Sheet 2

INVENTOR.
JOHN T. VENALECK
BY
*Oldham & Oldham*
ATTORNEYS

United States Patent Office 3,497,879
Patented Mar. 3, 1970

1

3,497,879
SELF-RISE BED
John T. Venaleck, Mentor, Ohio, assignor to Russo Industries, Inc., Bedford Heights, Ohio, a corporation of Ohio
Filed July 8, 1968, Ser. No. 743,202
Int. Cl. A47c 19/12
U.S. Cl. 5—110                                          10 Claims

ABSTRACT OF THE DISCLOSURE

This bed includes a bedframe having a pair of transversely extending support legs pivotally secured to the bedframe adjacent each end thereof. A pair of torsion bars operatively engage one support leg of each pair and extend longitudinally of the bed to be journalled in a support leg at the other end of the bed and engage the other and adjacent support leg by a crank arm section formed on the torsion bar whereby when the support legs are moved to collapsed positon, a torsion is set up in the torsion bars to provide a self-rising action in the bed, while maintaining the bedframe substantially parallel to the floor. Lock means are provided to secure the support legs in collapsed or extended positions.

---

The present invention relates to folding beds, cots and the like and it particularly comprises a new self-rising bed which is of sturdy, improved construction.

In many uses for beds, such as in college dormatories, motels, and other places, it frequently is desirable to have the beds or cots be adapted to be stored in a collapsed position. Thus, a compact, collapsed, or inoperative bed position can be provided so that the bed may be stored, for example, under another non-folding bed, or in any other desired area.

The general object of the present invention is to provide a novel and improved self-rising bed characterized by the provision of pairs of transversely extending support legs at each end of the bedframe and by torsion bar means operatively secured to and extending between the different support legs for providing a self-rising action in the bed when collapsed and then released.

Another object of the invention is to provide special lock means in a collapsible bed to retain the bed in either collapsed, inoperative position and to lock the bedframe components in support leg extended, or opeartive positions, which lock means may be unified by a control means extending therebetween and providing a stabilizer for movement of the bedframe support legs.

Another object of the invention is to provide sturdy support legs in a bed and which support legs have a pivotal action in a direction transversely of a bed and wherein caster support means are provided on fixed axes perpendicular to the longitudinal axis of the support leg.

Another object of the invention is to provide a novel torsion bar construction in a collapsible bedframe or cot to provide at least some lifting action in the bed when it has been positively moved to a collapsed or inoperative position and then is released to be moved or forced to support leg extended or operative positions.

Yet another object of the invention is to provide a novel linkage embodied in the crank arms of the torsion bars and the pivoted support legs and the locking bars, such that the plane of the mattress (frame) remains parallel to the floor in both the fully raised (or operative) position and the fully collapsed position, and is substantially parallel at any location between these extremes.

The foregoing and other objects and advantages of the invention will be made more apparent as the specification proceeds.

2

Reference now is made to the accompanying drawings, wherein:

FIG. 1 is an end elevation of a bed embodying the principles of the invention and with a mattress being shown thereon;

FIG. 2 is an inverted or bottom perspective view of the folding bed of FIG. 1;

FIG. 6 is a fragmentary inverted perspective of the torsion bar means of the new bed.

When referring to corresponding members shown in the drawings and referred to in the specification, corresponding numerals are used to facilitate comparison therebetween.

Figure 3:
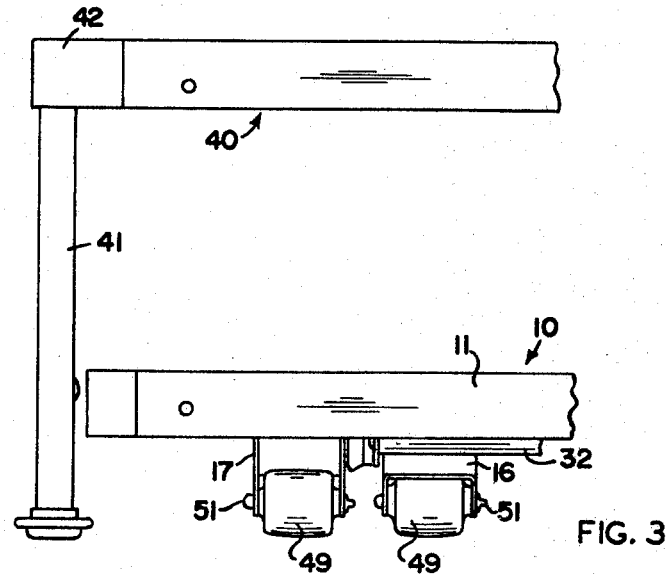
FIG. 3 is a fragmentary side elevation of a portion of the folding bed of FIG. 1 indicating it being received under another bed for storage.

Attention now is particularly directed to details of the structures shown in the accompanying drawings, and a folding or self-rising bed, cot or the like, is indicated as a whole by the numeral 10. This self-rise bed or cot 10 includes a substantially rectangular bedframe 11 of conventional construction to which any suitable spring means 12 is operatively secured. A mattress 13 is indicated positioned on the bed or cot 10 in FIG. 1 of the drawings.

In this improved bed of the invention, pairs of transversely extending support legs 14 and 15, and 16 and 17, are provided, respectively, adjacent each end of the bedframe 11. The drawings clearly show that the support legs 14 and 16 are the axially inner of the pairs of support legs and with the support legs 15 and 17 thus being the axially outer support leg of each of the pairs of the support legs. The support legs are preferably formed from sturdy, relatively wide metal members that are in the cross sectional shape of channels so that the support legs are, in effect, of flattened U-shape in section. These support legs are pivotally secured to the bedframe by conventional means such as individual brackets 18 suitably secured to the bedframe 11 and with means, such as rivets or support shafts or pins 19 extending through the brackets and engaging a support leg to secure the upper end of each support leg to the bedframe for movement in a plane that is perpendicular to the plane defined by the substantially rectangular bedframe 11. The drawings clearly show that all of the support legs are directed laterally inwardly and also downwardly with relation to the bedframe 11 and with such legs having, as hereinafter described in more detail, collapsed or inoperative positions and extended, or operative positions. Each support leg preferably is of a length so as to be substantially equal to the width of the bedframe 11.

Figure 4:
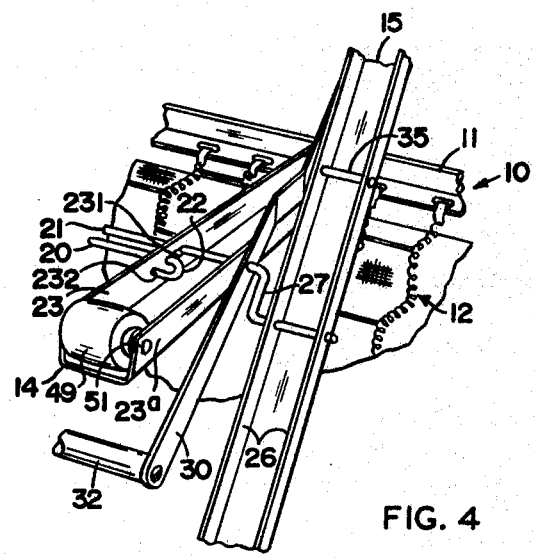
FIG. 4 is an enlarged fragmentary perspective view of one pair of support legs and the lock and torsion bar means operatively associated therewith.
Figure 5:
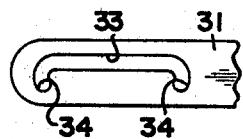
FIG. 5 is a fragmentary enlarged elevation of a portion of a locking arm.

As an important feature of the present invention, a pair of torsion bars 20 and 21 are provided and they extend axially of the bedframe 11 but with one end of each torsion bar being anchored or secured in place against torsion forces. Hence, one end of the torsion bar 20 has a hook-shaped end portion 22, FIG. 4, provided thereon and with the torsion bar extending through a suitable aperture, slot or hole 231 provided in a flange 23 of the support leg 14 and then having the remaining or terminal portion of the hook-shaped end portion 22 extend back and engage a second suitable aperture 232 formed in the flange 23 whereby the hook-shaped end portion 22 is locked in position against torsion action or forces applied to the remainder of the torsion bar 20. The aperture 231 in the flange 23 of the support leg 14 is preferably in the form of a slot which is long enough to allow the hook-shaped portion 22 to pass through the flange 23 for ease of assembly of the end portion of the hook through the hole 232. The opposite end of the torsion bar 20 extends through both flanges 24 and 25 provided on the support leg 16 and terminates in a crank arm portion 120 corresponding to that formed on the other torsion bar 21 and engaging support leg 17. The torsion bar 21 likewise has one hook-shaped end portion 122 engaging the flange 24 on the axially inner support leg 16 and the torsion bar extends longitudinally of the frame to and through the flanges 23 and 23a of the support leg 14, as shown in FIG. 4, to be journalled therein. A crank arm portion 27 is formed on the end of this torsion bar 21 and it, in turn, is suitably received in holes or apertures provided in one or both flanges 26 of the support leg 15, as shown in FIG. 4, to be suitably anchored therein. The crank arm portions 120 and 27 of each of the torsion bars 20 and 21 are journalled in the side flanges of the outer channel-shaped legs 15 and 17 and are substantially in axial alignment with respect to each other. Thus, it is seen that one end of each torsion bar 20 or 21 is anchored adjacent each end of the bedframe 11 and with the remaining length of the torsion bar being free of torsional movement and forces to be set up therein with movement of the support legs 14 and 15, and 16 and 17 in relation to each other and to the bedframe. The drawings clearly show that both torsion bars 20 and 21 preferably are positioned transversely closer to one edge of the bed, passing through the inner support legs 14 and 16 at a point substantially further than half the length of the support leg from the pivot pins, or means 19, and passing through the outer support legs 15 and 17 at a point substantially less than half the length of the support leg from the pivot means 19 therefor. The points at which the torsion bars 20 and 21 pass through the support legs 14, 15, 16 and 17 are chosen such that the crank arm portions 27 and 120 are substantially vertical when the bed or cot is in the raised or operable position. The vertical orientation of the crank arm in the raised position gives maximum leverage to resist torques on the apparatus caused by loads placed off center of the frame as when a person would sit on an edge of the bed or cot. The exact transverse position of the torsion bars 20 and 21 is chosen such that the bedframe 11 will remain parallel to the floor in both the raised or operable position and in the collapsed position, such geometry depending upon the length and position of the crank arm portions. In all events, the crank arm portions 27 and 120 on the torsion bars are positioned whereby an arcuate movement of this crank arm portion is provided by the relative pivotal movement between the support legs occasioned by raising or lowering the bedframe 11.

Movement of the axially outer support legs 15 and 17 preferably is unified by a reenforcing bar 50 secured thereto and extending therebetween.

In order to retain the support legs in either extended, operative position or in collapsed, inoperative position and to correlate movement thereof, suitable lock means are associated with the pairs of support legs 14 and 15, and 16 and 17. Thus, FIG. 4 shows one lock arm 30 which is journalled on an end portion of the torsion bar 21 which, in turn, is journalled in flange 23a of the leg 14. A similar lock arm 31 is similarly journalled at the opposite end on the torsion bar 20, journalled in the outer flange of the leg 16 at the opposite end of the bed. Such journalled sections of the lock arms 30 and 31 are substantially in axial alignment. The two lock arms 30 and 31 extend transversely of the bedframe between the adjacent support legs 14 and 15, and 16 and 17. The lock arms, it will be seen, also serve as fulcrums for the crank arm portions of the torsion bars 20 and 21. The free ends of the lock arms 30 and 31 extend to a point below, but usually adjacent the lateral margins of the bedframe and are coupled together for unitary movement thereof by a control bar 32 that is suitably secured to the ends of the lock arms for unitary movement thereof. The other end portions of the lock arms 30 and 31 are each provided with a longitudinally extending slot 33 with two longitudinally spaced locking notches 34 formed in the slot, normally immediately adjacent or at the end portions thereof. A headed member or locking member, such as a rivet or equivalent device 35, is secured to the axially inner flange of each of the axially outer support legs 15 and 17 and which headed members 35 extend through the slots 33 in the lock arms 30 and 31. This member 35 and its relationship to the slots 33 and notches 34 is such that the member 35 will seat in one of the notches 34 when the support legs are positioned in either an extended or in a retracted, or collapsed, position so as to lock the support legs in these given positions and either present the cot 10 for use, or to lock the components thereof in collapsed position for storage. The control bar 32 with the attached locking arms 30 and 31 forms, in addition to a locking function, a stabilizing action which coordinates the actions of the two sets of legs to operate substantially in unison and, thereby, results in a substantially horizontal position of the bedframe during raising or lowering and provides a smooth bind-free vertical action.

By predetermining the normal loads placed on the pairs of support legs 14 and 15 and 16 and 17, and by measuring the torsional forces set up in the torsion bars 20 and 21 by arcuate movement of the crank arm portions 120 and 27 thereof, one can calculate the length required for such crank arms so that sufficient torsional forces will bet set up therein for proper cot lifting action when the support legs are forced, or moved to their collapsed or inoperative positions. Of course, the torsion bars are so assembled, constructed and arranged as to set up torsion therein when the support legs are collapsed. While other forms of fabrication would be acceptable, it is preferred that, in the fabrication of the torsion bars, which are of the same size and shape, the hook and crank portions lie in the same plane. At assembly of the torsion bars 20 and 21 through the flanges of the support legs 14, 16 and 17, for the bar 20 and 16, 14 and 15, for the bar 21, the hook and crank ends are twisted with respect to each other to provide equal pre-torsional forces within the torsion bars. Thus, such torsional forces can be predetermined and calculated or adjusted so that when the lock means are released by movement of the control bar 32 lifting the lock arms upwardly to release the headed members from the notches 34, sufficient energy is stored in the torsion bars as to provide an automatic, self-rising action for the bed or cot. Or, if it s not desired that a completely automatic self-rising action be provided, at least some lifting forces are provided to move the bed upwardly and at least partially move the bed to its elevated or operative position or aid in such action.

FIG. 6 of the drawings shows that the torsion bars 20 and 21 cross each other and set up balanced counter-clockwise stresses as indicated by the arrows 100 and 101 for the end portions 22 and 122 of the torsion bars 20 and 21, respectively, when the bed is moved to a collapsed position. A clockwise unwinding of the crank arm end portions of the torsion bars 20 and 21 results in the raising of the legs 15 and 17 about their hinged frame connections on one side of the bedframe, and the counterclockwise resistance offered by the anchored end portions of the torsion bars results in raising the support legs 14 and 16 about their hinged frame connections on the other side of the bedframe. Arrows 102 and 103 indicate the forces exerted on the legs 15 and 17.

FIG. 3 of the drawings shows that another bed or cot indicated by the numeral 40 may be used in association with the cot 10. Thus, when the cot 10 is moved to its inoperative position, the cot can be moved under the bed or cot 40 for storage. Usually the bed 40 may have support legs 41 thereon secured thereto by end brackets 42 whereby the bed 40 is slightly longer than the bed or cot 10 which thus can be readily rolled in under the bed 40 from the sides thereof.

The cot 10 preferably is supported on relatively wide rollers 49 that are secured to the lower end portions of the support legs 14 through 17 by support pins or shafts 51 that are carried by and suitably engaged with the flanges of the channel shaped support legs. Hence, the rollers 49 are retained on their operative axes, which are perpendicular to the longitudinal axis of the individual support leg on which such rollers are positioned, to facilitate the raising and lowering of the bed or cot 10 by the transversely directed movement of the support legs. The rollers 49 and associated means can be of any conventional construction to provide a smooth, low friction cot support action.

In view of the foregoing, it is believed that a novel and improved self-rising bed or cot has been provided, and that this cot can be readily moved to and from operative positions and be collapsed conveniently for storage. Hence, it is thought that the objects of the invention have been achieved.

While one complete embodiment of the invention has been disclosed herein, it will be appreciated that modification of this particular embodiment of the invention may be resorted to without departing from the scope of the invention.

What is claimed is:

1. A folding bed, cot, or the like, comprising a bedframe and spring means operably attached to said bedframe, the improvement comprising:
   pairs of transversely extending support legs pivotally secured to said bedframe at each end thereof to provide an axially inner and an axially outer support leg at each end of said bedframe, said support legs having collapsed and extended positions,
   a pair of torsion bars each secured at one end to an axially inner one of said support legs and extending axially to the other pair of said support legs and has a portion in journalled engagement with the other of said axially inner of said support legs, each of said torsion bars having a crank arm extending from the journalled portion thereof and secured to the axially outer support leg thereadjacent, whereby a lifting force is provided by said torsion bars on said support legs when said support legs are moved to their collapsed positions, and
   lock means associated with said support legs to engage and secure them in collapsed or extended position.

2. A folding bed, cot or the like as in claim 1 where said support legs are of channel shape in section and said bed will automatically move from a collapsed to an extended support leg position when said lock means are released.

3. A folding bed, cot or the like as in claim 1 where said torsion bars and the crank arms thereof engage said support legs offset from the longitudinal center thereof and where said crank arms are substantially vertically positioned when said support legs are in extended position.

4. A folding bed, cot or the like as in claim 1 where said lock means include a lock arm journalled on each of said torsion bars adjacent the crank arm thereof, and a control bar secured to and extending between said lock arms.

5. A folding bed, cot or the like as in claim 4 where said lock arms extend transversely of said bedframe and each has a longitudinally extending lock slot therein and a lock member is carried by each of said axially outer support legs to engage said lock arm slot to retain said support legs in extended or collapsed positions.

6. A folding bed, cot or the like as in claim 1 where relatively wide casters are journalled on the lower ends of each of said support legs and are retained on axes perpendicular to the longitudinal axis of the support leg to which it is secured.

7. A self-rise folding bed, cot, or the like, including a bedframe and spring means operably attached to said bedframe, the improvement comprising:
   pairs of transversely extending support legs pivotally secured to said bedframe adjacent each end thereof for movement transversely of said bedframe and providing an axially inner and an axially outer support leg at each end of said bedframe, said support legs having collapsed and extended positions,
   a pair of torsion bars each secured at one end to an axially inner one of said support legs and extending axially in opposite directions to the other pair of said support legs and having a portion in journalled engagement with the other of said axially inner of said support legs, each of said torsion bars having a crank arm extending from the journalled portion thereof and secured to the axially outer support leg thereadjacent, said torsion bars being crossed intermediate the ends thereof and being secured in position so that balanced lifting forces are set up therein when said support legs are moved to their collapsed positions, and
   lock means to engage said support legs and secure them in collapsed or extended position.

8. A folding bed, cot or the like as in claim 7 where the crank arms of said torsion bars engage said axially outer support legs offset from the longitudinal center of said support legs, and the opposite ends of said torsion bars engage the axially inner of said support legs offset on the other side of the longitudinal center of such support legs.

9. A self-rise folding bed, cot, or the like, including a bedframe, the improvement comprising:
   pairs of transversely extending support legs pivotally secured to said bedframe adjacent each end thereof for movement transversely of said bedframe and providing an axially inner and an axially outer support leg at each end of said bedframe, said support legs having collapsed and extended positions,
   a pair of torsion bars each secured at one end to an axially inner one of said support legs and extending axially in opposite directions to the other pair of said support legs and having a portion extending through the other of said axially inner of said support legs,
   a lock arm adjacent each end of said bedframe individually journalled on the extending portions of said torsion bars, each of said torsion bars having a crank arm extending from the journalled portion thereof and secured to the axially outer support leg thereadjacent,
   cooperating lock means on one of each pair of said support legs and on said lock arms to secure said support legs in collapsed or extended position, and
   a control bar secured to and connecting said lock arms to stabilize and unify movement of said support legs.

10. A folding bed, cot or the like as in claim 9 where the crank arms of said torsion bars engage said support legs offset from the longitudinal center of said support legs, and the crank arms are substantially vertically positioned when said support legs are in extended position.

References Cited

UNITED STATES PATENTS

| | | | |
|---|---|---|---|
| 2,008,616 | 7/1935 | Blaha | 5—110 |
| 2,074,019 | 3/1937 | Krakauer | 5—110 X |
| 2,641,247 | 6/1953 | Genebach | 108—145 X |
| 3,080,066 | 3/1963 | Berridge et al. | 108—136 X |

FOREIGN PATENTS

| | | |
|---|---|---|
| 138,267 | 7/1934 | Austria. |

DENNIS L. TAYLOR, Primary Examiner

U.S. Cl. X.R.

108—136